United States Patent [19]

Bessler

[11] Patent Number: 5,285,648
[45] Date of Patent: Feb. 15, 1994

[54] DIFFERENTIAL PRESSURE SUPERHEAT SENSOR FOR LOW REFRIGERANT CHARGE DETECTION

[75] Inventor: Warren F. Bessler, Schenectady, N.Y.

[73] Assignee: General Electric Company, Schenectady, N.Y.

[21] Appl. No.: 964,545

[22] Filed: Oct. 21, 1992

[51] Int. Cl.$^5$ ............................................. F25B 49/02
[52] U.S. Cl. .................................... 62/129; 200/83 P
[58] Field of Search ................. 62/126, 125, 129, 127, 62/225, 209, 212; 340/626; 200/83 P, 83 A

[56] References Cited

U.S. PATENT DOCUMENTS

| | | | |
|---|---|---|---|
| 2,795,189 | 6/1957 | Haberland | 200/83 P |
| 3,383,031 | 5/1968 | Ellis et al. | 200/83 P |
| 3,698,204 | 10/1972 | Schlotterbeck et al. | 62/206 |
| 3,913,347 | 10/1975 | Stevens | 62/209 |
| 4,006,083 | 2/1977 | Westervelt et al. | 200/83 P |
| 4,167,858 | 9/1979 | Kojima et al. | 62/126 |
| 4,220,836 | 9/1980 | Hersey | 200/83 P |
| 4,651,535 | 3/1987 | Alsenz | 62/225 |
| 4,653,288 | 3/1987 | Sayo et al. | 62/210 |
| 4,677,830 | 7/1987 | Sumikawa et al. | 62/126 |
| 4,745,765 | 5/1988 | Pettitt | 62/129 |
| 4,745,767 | 5/1988 | Ohya et al. | 62/211 |

FOREIGN PATENT DOCUMENTS 51-1943 1/1976 Japan .

*Primary Examiner*—Harry B. Tanner
*Attorney, Agent, or Firm*—Patrick R. Scanlon; Paul R. Webb, II

[57] ABSTRACT

Low charge detection for a refrigeration system is accomplished using a differential pressure sensor which detects superheat at the evaporator exit. The differential pressure sensor includes a casing having a reference chamber containing a reference charge of refrigerant. A pressure responsive snap member is disposed in the casing so as to have one side exposed to the reference chamber and another side exposed to the exit pressure of the evaporator. The snap member is normally biased into a first position but snaps to a second position when the pressure differential across it exceeds a predetermined level. When a low charge condition exits, the evaporator exit will exhibit superheat. Heat conduction through the casing raises the temperature, and thus the pressure in the reference chamber. Thus the pressure differential which causes the snap member to snap to the second position is created. A switch which opens and closes in response to the movement of the pressure responsive snap member is located in the casing. The switch can be connected to deactivate the system compressor, activate an indicator, or do both in response to excess superheat being detected.

18 Claims, 4 Drawing Sheets

DIFFERENTIAL PRESSURE SUPERHEAT SENSOR FOR LOW REFRIGERANT CHARGE DETECTION

CROSS REFERENCE TO RELATED APPLICATIONS

This application is related to copending application entitled "Low Refrigerant Charge Detection Using Thermal Expansion Valve Stroke Measurement," Serial No. 07/964,244, filed concurrently herewith and assigned to the same assignee as the present invention.

BACKGROUND OF THE INVENTION

This invention relates generally to detecting low refrigerant charge in refrigeration systems, particularly automotive air conditioning systems, and more particularly concerns an apparatus which uses a differential pressure sensor to detect high superheat at the evaporator exit. As used herein, the term "refrigeration system" refers to refrigerators, air conditioners or any other system which produces a refrigeration effect. However, the present invention is most applicable to air conditioning systems for automobiles.

In typical automotive air conditioning systems, refrigerant tends to leak through hose permeation and the rotating compressor shaft seal. Refrigerant leakage causes many problems. First, the release of refrigerants into the environment is believed to cause environmental damage. For this reason, enactment of a federal environmental protection law requiring low charge detection systems for automobiles is anticipated. Second, when the refrigerant charge becomes insufficient, the reliability and cooling performance of the system suffer. Thus, a refrigeration system with a low charge is inefficient and wasteful of energy. Furthermore, low charge causes increased compressor operating temperatures while lowering mass flow rate. Reduced mass flow rate can result in insufficient flow of lubricating oil to the compressor. The lack of oil combined with high temperatures eventually causes compressor failure. Thus, there is much interest in developing means for detecting low charges.

There are a number of known ways to detect low charge, but many of these present certain disadvantages. For instance, determining low charge by measuring refrigerant inventory will not always be accurate because the optimum inventory level varies in accordance with many variables such as compressor speed, ambient and interior temperatures, blower speed, and component volumes. Other systems employ a low pressure cut-off switch which deactivates the compressor when system pressure falls below a predetermined threshold. However, since system pressures fluctuate greatly during proper operation (25-46 psi is typical), the predetermined threshold pressure must be set very low, such as 10-20 psi. As a result, the low pressure cut-off switch is effective to indicate only a severe loss of charge resulting from a ruptured hose or complete shaft seal failure. This switch will not detect marginal low charge conditions.

One way of detecting low charge which avoids the above problems is to monitor the superheat at the evaporator exit. Superheat is the amount of temperature above the saturation temperature of the refrigerant. It is well known that excessive evaporator exit superheat is indicative of insufficient charge. For instance, U.S. Pat. No. 4,677,830 to Seiji Sumikawa et al. discloses providing a pressure sensor and a temperature sensor near the evaporator exit. An electronic control unit converts the measured pressure to a corresponding saturation temperature of the refrigerant. The difference between the measured temperature and the corresponding saturation temperature (i.e., the superheat) is then compared to a predetermined reference value to determine whether there is a sufficient quantity of refrigerant. If an insufficient charge is detected, the compressor is rendered inoperative by a signal from the electronic control unit.

U.S. Pat. No. 4,745,765 to Edward D. Pettitt discloses another device which uses evaporator exit superheat to detect low charge. This device operates on the pressure differential between the refrigerant pressure at the evaporator exit and a reference pressure. The device includes a pair of corrugated metal bellows members; one sealed with a certain amount of refrigerant, the other being open to the evaporator exit. An arm member carrying a switch contact is mounted between the two bellows members for movement therewith. As the amount of superheat rises, the reference pressure exceeds the evaporator exit pressure. This causes the sealed bellows member to expand and move the arm member. At some point, the arm member will be moved far enough so that the switch contact engages a second contact mounted on a bimetallic disk. The engagement of the contacts closes a circuit which either provides an alert signal or shuts down the system.

The dual bellows members of U.S. Pat. No. 4,745,765 present a mechanically complicated arrangement. The many moving parts and the attendant difficulty of construction produces high costs. The bellows are also subjected to repeated expansion and contraction causing rapid wear and a short service life. Furthermore, the bellows arrangement can tend to give indefinite signals because the contacts are not necessarily positively forced into contact. That is, the bellows members may assume a position where the contacts are only lightly touching. In this case, the contacts would tend to fluctuate in and out of contact with each other, thereby producing an indefinite signal.

SUMMARY OF THE INVENTION

Accordingly, it is an object of the present invention to provide an uncomplicated apparatus for detecting marginal low charge conditions.

More specifically, it is an object of the present invention to provide an evaporator exit superheat sensor which detects marginal low charge conditions.

In addition, it is an object of the present invention to provide such a superheat sensor which does not require direct temperature measurement, thereby eliminating the need for mathematical conversion of system pressure to saturation temperature.

It is another object of the present invention to provide a superheat sensor which does not require a microprocessor or engine control computer to perform low charge detection.

It is yet another object of the present invention to provide a superheat sensor which utilizes a differential pressure snap member that produces a definite indication of low charge.

It is still another object of the present invention to provide a superheat sensor which does not employ nondurable parts.

These and other objects are accomplished in the present invention by providing a low refrigerant charge detecting apparatus for a refrigeration system including a casing having a reference chamber containing a reference charge of refrigerant. A pressure responsive snap disk member is disposed in the casing so as to have one side exposed to the reference chamber and another side exposed to the exit pressure of the system evaporator. The snap member is normally biased into a first position where it is bowed downward but snaps to a second position where it is bowed upward when pressure in the reference chamber exceeds a predetermined level. The apparatus is designed so that the snap member snaps to the second position when excess superheat is present at the evaporator exit. A switch which opens and closes in response to the movement of the pressure responsive snap member is also located in the casing below the snap member. A transmission member in the form of an elongated rod is positioned between the snap member and the switch. The transmission member transmits the displacement of the snap member to the switch, either opening or closing the switch whenever the snap member snaps to its second position. The switch can be connected to deactivate the system compressor, activate an indicator, or do both in response to excess superheat being detected.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE INVENTION

Figure 1:
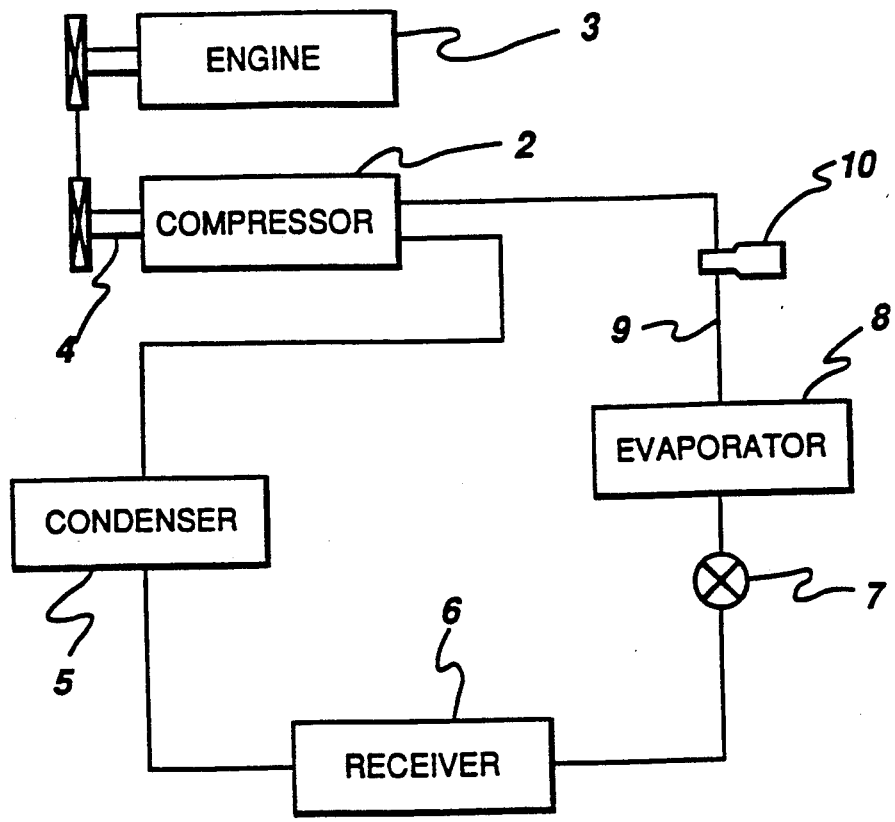
FIG. 1 is a schematic diagram of a refrigeration system having the low refrigerant charge detecting apparatus of the present invention.

Referring to the drawing wherein the same reference numerals are used to identify the same elements throughout the several views, FIG. 1 shows a refrigeration system which includes a low refrigerant charge detecting apparatus 10 of the present invention. The refrigeration system, which will typically be an automotive air conditioning system, includes a compressor 2 which is selectively driven by an engine 3 through a clutch 4, with refrigerant being compressed by the compressor 2 to high temperature and pressure. The refrigerant is then condensed by a condenser 5 where it loses heat to the ambient. The refrigerant is then directed to a receiver 6 which passes only liquid refrigerant, thereby separating any vaporous refrigerant which may not have been fully condensed by the condenser 5. The liquid refrigerant flows through an expansion device 7, which may be an expansion valve or an orifice tube, so that it undergoes adiabatic expansion. The now low pressure refrigerant flows through an evaporator 8 where it is vaporized through the absorption of heat around the evaporator 8. The gaseous or mostly gaseous refrigerant exiting the evaporator 8 is returned to the compressor 2 via a suction line 9 to repeat the cycle.

Figure 2:
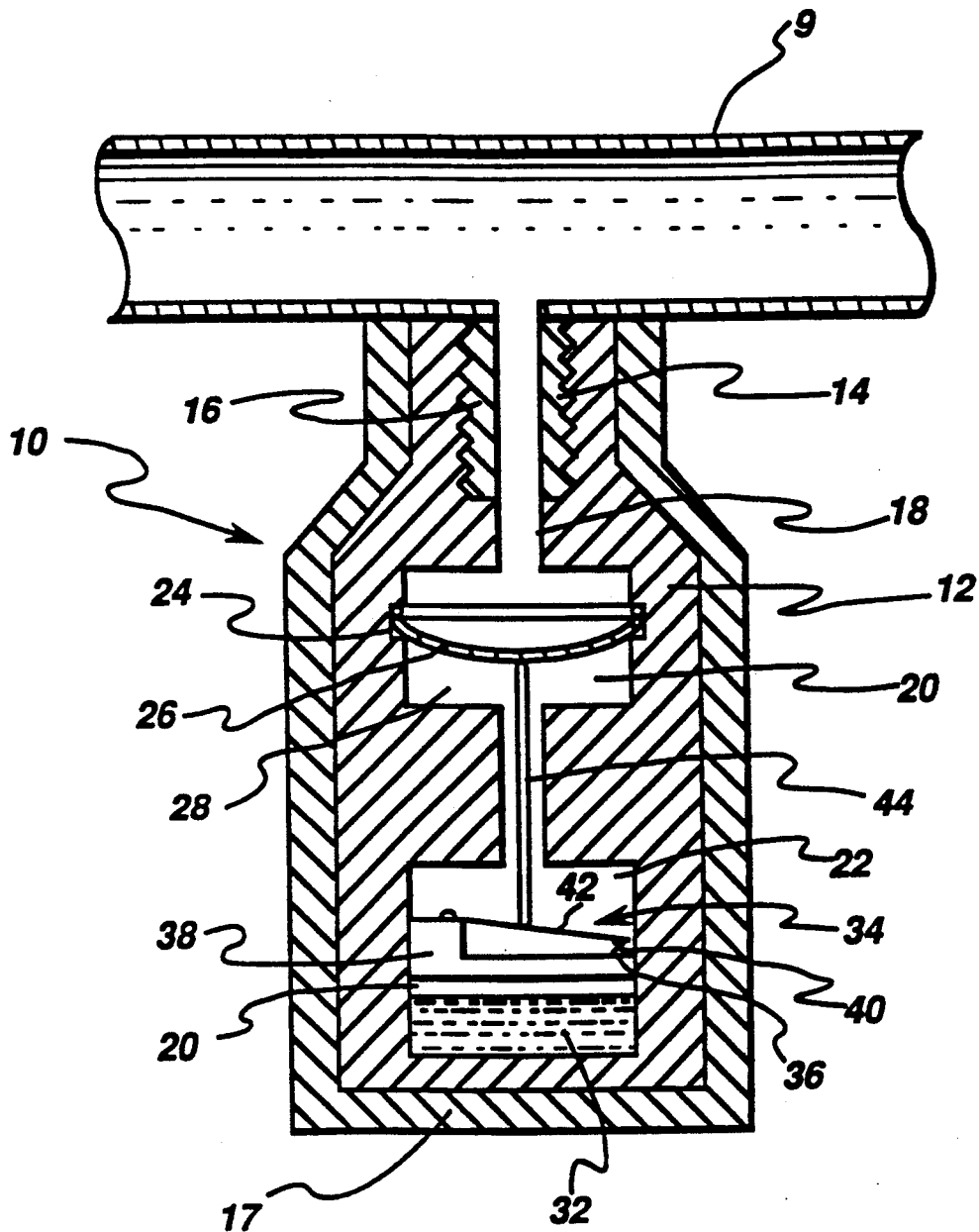
FIG. 2 is a sectional view of the low refrigerant charge detecting apparatus of the present invention under sufficient charge conditions.
Figure 3:
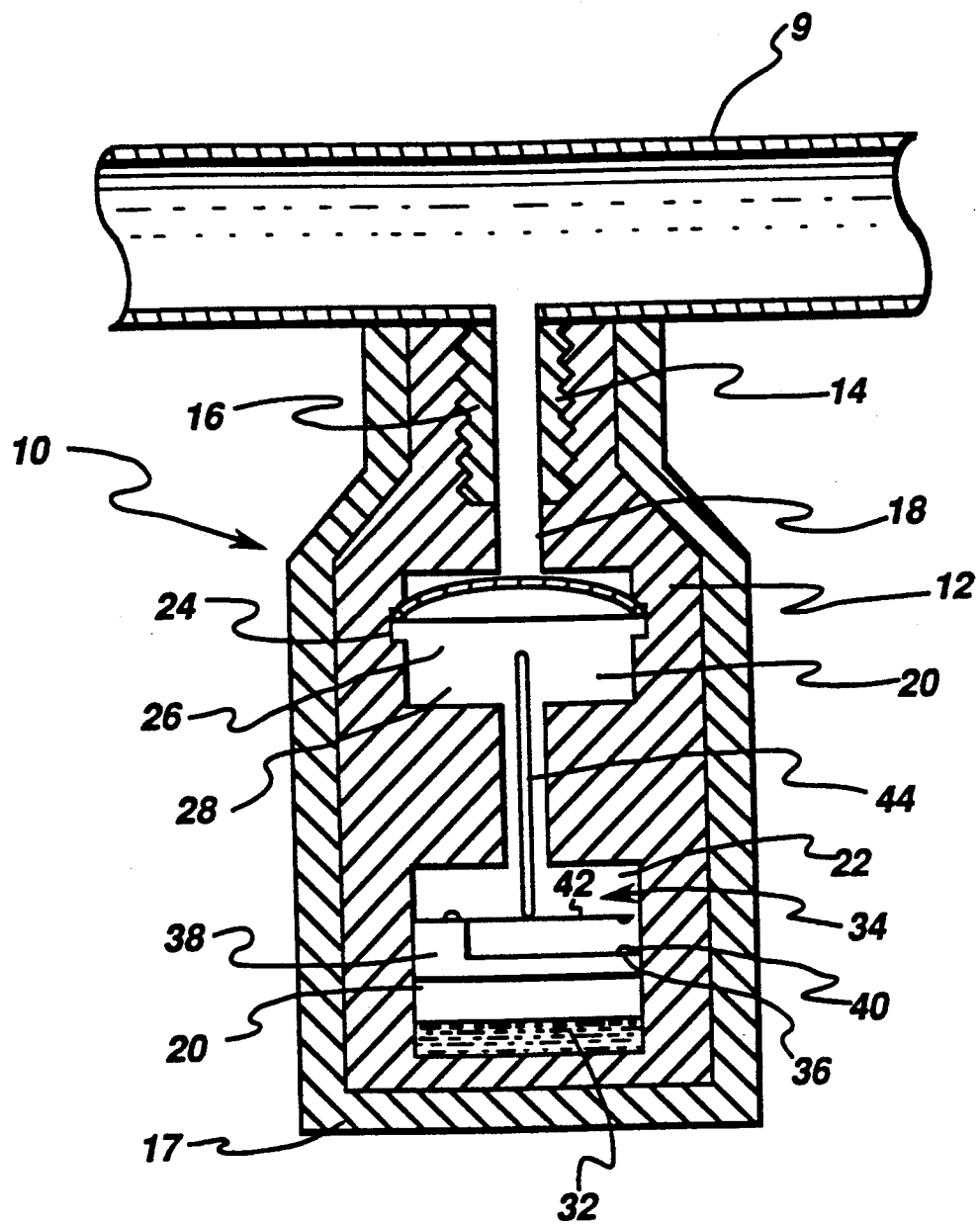
FIG. 3 is a sectional view of the low refrigerant charge detecting apparatus of the present invention under low charge conditions.

The low refrigerant charge detecting apparatus 10 of the present invention is located on the suction line 9 between the exit of the evaporator 8 and the suction side of the compressor 2. Referring to FIGS. 2 and 3, the low refrigerant charge detecting apparatus 10 comprises a casing 12 which is coupled to the suction line 9 at an externally threaded access port 14. The coupling is made by an internally threaded fitting 16 at one end of the casing 12. The access port 14 provides fluid communication between the suction line 9 and the interior of the casing 12. The casing 12 is enveloped by a layer of thermal insulating material 17 and is made of a material having good thermal conductivity, preferably a metal such as aluminum. The casing 12 also has a centrally-positioned cavity 18 formed therein with an opening at the fitting 16 so as to provide the fluid communication with the access port 16. The cavity 18 is preferably a bore of generally narrow diameter and having first and second enlarged sections 20,22.

The first enlarged section 20, which is nearest to the access port 14, is provided with an annular recess 24. A pressure responsive snap member 26 sits in the annular recess 24. The snap member 26 is a thin disk having a slightly larger diameter than the annular recess 24 so that the snap member 26 is forced into a bowed or flexed configuration. Thus, the snap member 26 can assume a first position having a downwardly-bowed configuration (FIG. 2) or a second position having an upwardly-bowed configuration (FIG. 3). The snap member 26 is constructed to be biased to the first position. That is, when no net forces are acting on the snap member 26, it will always assume the first position. However, if a sufficient upward net force is applied to the snap member 26, it will snap into the second position of FIG. 3. Although a circular cross-section is preferred for the snap member 26, other shapes are possible. Of course, the shape of the cavity 18 and recess 24 would have to be accordingly changed to accommodate any alternative snap member shape.

The snap member 26 fits snugly in the annular recess 24 to seal off the portion of the cavity 18 below the snap member 26, thereby defining a reference pressure chamber 28. The seal formed by the snap member 26 is made air tight by the inclusion of an O-ring 30 in the annular recess 24. The reference pressure chamber 28, which includes the second enlarged section 22, is provided with a reference charge 32 of refrigerant therein. The reference charge 32 is of a sufficient amount to ensure that under all operating conditions there will exist a two phase (vapor and liquid) mixture of the reference charge refrigerant. The type of refrigerant used for the reference charge 32 should the same as the system refrigerant or at least have an identical or nearly identical vapor pressure curve as the system refrigerant.

The snap member 26 thus has one side facing the reference pressure chamber 28 and the other side facing the open upper portion of the cavity 18. Therefore, the net external force acting on the snap member 26 will be the pressure differential created by the pressure in the open upper portion of the cavity 18, which is the pressure in the suction line 9, and a reference pressure which is created in the reference pressure chamber 28. This reference pressure will be the saturated pressure of the reference charge 32 at the temperature of the chamber 28. The temperature of the chamber 28 is directly controlled by the temperature of the system refrigerant at the exit of the evaporator 8 because of the high thermal conductivity of the casing 12. Thus, if the evaporator exit temperature increases, heat will be conducted through the casing 12, raising the temperature of the pressure reference chamber 28. The outer layer of insulating material 17 will retard the effects of ambient temperature and promote equal heat distribution throughout the casing 12, thereby producing more accurate results. As the chamber temperature rises, more of the reference charge will vaporize and the reference pressure will increase. As the reference pressure increases above the suction pressure, the differential pressure across the snap member 26 will eventually reach a point at which the snap member 26 snaps from the first position to the second position.

Figure 4:
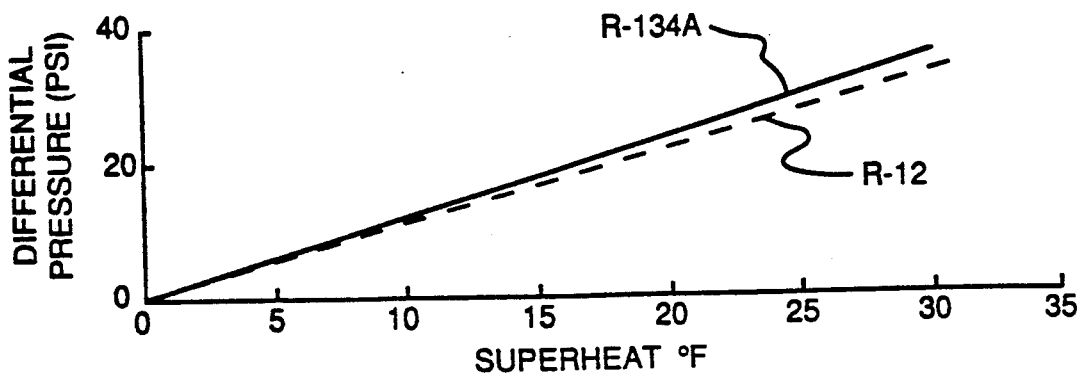
FIG. 4 is a graph showing the relationship between the differential pressure and the amount of superheat for a 40° F. evaporator using refrigerants R-12 or R-134A.

Because there is a determinable relationship between the differential pressure exerted across the snap member 26 and the amount of evaporator superheat, the snap member 26 can be specifically constructed so as to snap from the first position to the second position at a predetermined level of superheat. FIG. 4 shows the relationship between the differential pressure and the amount of superheat for a 40° F. evaporator using refrigerants R-12 or R-134A as an example. This relationship shows that if an indication of 15° F. superheat was desired, then the snap member 26 would have to be constructed so as to snap from the first position to the second position at a differential pressure of about 20 psi. Or, if an indication of 30° F. superheat was desired, then the snap member 26 would have to be constructed so as to snap from the first position to the second position at a differential pressure of about 40 psi.

A switch 34 is disposed in the second enlarged section 22 of the cavity 18. The switch 34 includes a stationary contact 36 mounted to an insulator base 38. A movable contact 40 is mounted to the insulator base 38 by a reed spring 42 in a location above the stationary contact 36. The reed spring 42 is normally biased away from the stationary contact 36 so that when no external forces are acting on it, the contacts of the switch 34 are open; when the reed spring 42 is deflected downward, the contacts are closed. The movement of the reed spring 42 and movable contact 40 is controlled by a transmission member 44. The transmission member 44 is an elongated, lightweight rod located in the center of the cavity 18 between the snap member 26 and the reed spring 42. The length of the transmission member 44 is slightly more than the distance between the center point of the snap member 26 and the reed spring 42 when the snap member 26 is in its first position, i.e., convex with respect to the switch 34, and less than the distance between the center point of the snap member 26 and the reed spring 42 when the snap member 26 is in its second position, i.e., concave with respect to the switch 34. Therefore, with the snap member 26 in the first position, the transmission member 44 is forced downward by the snap member 26, thus deflecting the reed spring 42 and closing the contacts of the switch 34. With the snap member 26 in the second position, the transmission member 44 is not displaced by the snap member 26 and the reed spring 42 deflects upward, opening the contacts of the switch 34. Of course, the bias of the reed spring 42 must be strong enough to lift the lightweight transmission member 44. The switch 34 is electrically connected to the clutch 4 by suitable conductors (not shown) so that when the switch 34 opens due to low charge, the compressor 2 is deactivated, thereby shutting down the refrigeration system.

In operation, when the refrigeration system is operating under normal charge conditions, the discharge from the evaporator 8 will be exhibit either zero or very little superheat. Consequently, the differential pressure across the snap member 26 will be small or nonexistent. Without sufficient differential pressure, the snap member 26 will be urged by its inherent bias into the first position. The transmission member 44 will accordingly be forced downward, thereby closing the switch 34 and permitting operation of the compressor 2. If, however, the refrigeration system experiences a loss of charge, then the evaporator exit will exhibit significant superheat. The increased heat will be transferred to the reference pressure chamber 28 via conduction through the casing 12. When the level of superheat reaches a predetermined level, the temperature of the reference pressure chamber 28 will eventually reach a point where the corresponding reference pressure rises to the critical level at which the snap member 26 is snapped to its second position. This releases the transmission member 44, thereby permitting the movable contact 40 to deflect upward and open the switch 34, which deactivates the compressor 2.

Even under full charge, an automotive air conditioning system can experience transient superheat at the evaporator exit. To avoid spurious reactions to such transient superheat conditions, the low charge detection apparatus 10 of the present invention can be provided with a time delay mechanism. One such mechanism would be to place a time delay circuit in series with the switch 34. Thus when the switch 34 is opened in response to a transient superheat condition, the time delay circuit, which could be any such type of device known in the art, would prevent deactivation of the compressor 2 for a time period which is longer than the typical duration of the transient superheat condition. Another possible mechanism is to rely on the inherent time delay of thermal conduction. That is, when the evaporator exit temperature reaches a critical level there will be a lag time before a sufficient quantity of heat is conducted through the casing 12 to raise the temperature of the reference pressure chamber to the critical level. By appropriately designing the casing 12, this lag time could be controlled so as to be longer than the typical duration of the transient superheat condition.

Figure 5A:
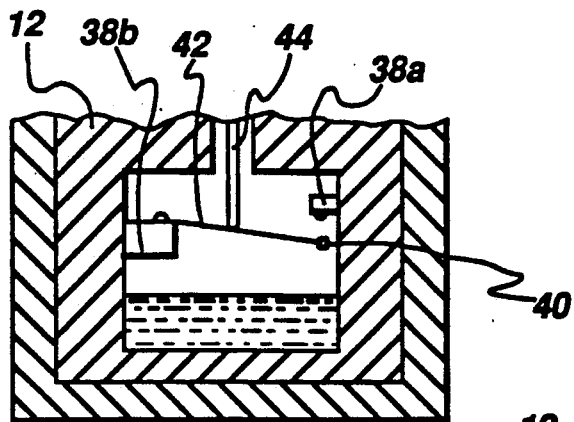
FIGS. 5A and 5B are partial sectional views of the low refrigerant charge detecting apparatus of the present invention showing a second embodiment of the switch.
Figure 5B:
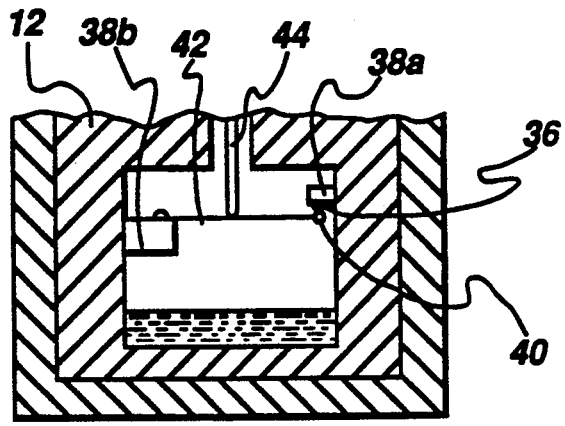

FIGS. 5A and 5B show an alternative embodiment of the switch 34. In this embodiment, the switch 34 includes a stationary contact 36 mounted to a first insulator base 38a. A movable contact 40 is mounted to a second insulator base 38b by a reed spring 42 in a location below the stationary contact 36. The reed spring 42 is normally biased toward the stationary contact 36 so that when no external forces are acting on it, the contacts of the switch 34 are closed, and when the reed spring 42 is deflected downward, the contacts are opened. FIG. 5A shows that when the snap member 26 is in the first position, flexed downward, the transmission member 44 is forced downward by the snap member 26, thus deflecting the reed spring 42 and opening the contacts of the switch 34. FIG. 5B shows the switch when there is excessive superheat and the snap member 26 is in the second position, flexed upward. The transmission member 44 is thus released and the reed spring 42 deflects upward, closing the contacts of the switch 34.

The switch 34 can be connected to the clutch 4 via a relay (not shown) so that when the switch 34 is closed, the relay deactivates the clutch 4, thereby shutting down the refrigeration system. The switch 34 can also be connected to an indicator (not shown), such as a light on the dashboard, so that when closed, the indicator is activated, thereby indicating that the refrigeration system is in need of service. Thus, this embodiment of the switch 34 can be arranged to deactivate the compressor, provide a visual low charge signal, or do both in response to excess superheat.

Figure 6A:
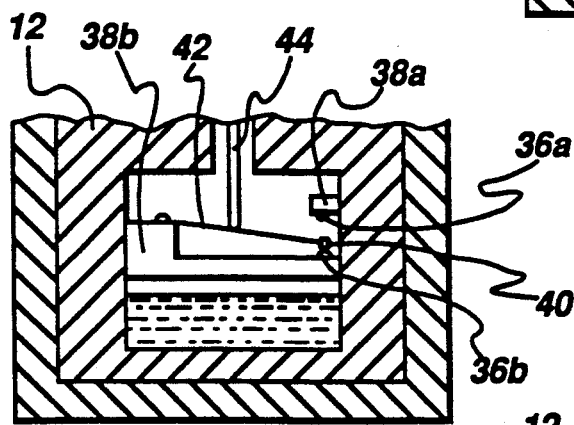
FIGS. 6A and 6B are partial sectional views of the low refrigerant charge detecting apparatus of the present invention showing a third embodiment of the switch.
Figure 6B:
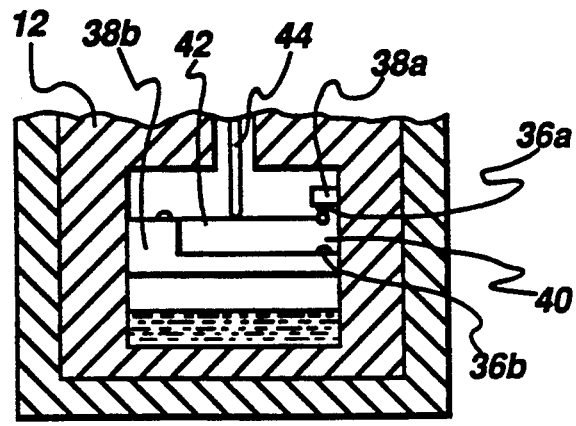

FIGS. 6A and 6B show another alternative embodiment of the switch 34. In this embodiment, the switch 34 includes a first stationary contact 36a mounted to a first insulator base 38a and a second stationary contact 36b mounted to a second insulator base 38b. A movable contact 40 is mounted to the second insulator base 38b by a reed spring 42 in a location between the two stationary contacts 36a, 36b. The reed spring 42 is normally biased toward the first stationary contact 36a so that when no external forces are acting on it, the movable contact 40 and the first stationary contact 36a are closed. When the reed spring 42 is forced downward, the movable contact 40 and the second stationary contact 36b are closed. The movable contact 40 and the first stationary contact 36a are connected in series with an indicator, while the movable contact 40 and the second stationary contact 36b are connected in series with the clutch 4. Thus, as long as there is not excessive superheat at the evaporator exit, the snap member 26 will be in the first position, as shown in FIG. 6A, and the movable contact 40 and the second stationary contact 36b are closed, thereby permitting the compressor 2 to operate. But when excess superheat develops, the snap member 26 will snap to its second position, as shown in FIG. 6B, and the movable contact 40 and the first stationary contact 36a are closed, thereby activating the indicator while rendering the compressor inoperative.

The foregoing has described an apparatus which senses differential pressure to detect high superheat at the evaporator exit as an indication of low charge. The device is an uncomplicated apparatus which is capable of detecting even marginal low charge conditions.

While specific embodiments of the present invention have been described, it will be apparent to those skilled in the art that various modifications thereto can be made without departing from the spirit and scope of the invention as defined in the appended claims.

What is claimed is:

1. A low refrigerant charge detecting apparatus for a refrigeration system including an evaporator, said apparatus comprising:
   a casing having a reference chamber containing a reference charge of refrigerant;
   a pressure responsive snap member disposed in said casing so as to have one side exposed to said reference chamber and another side exposed to the exit pressure of the evaporator, said pressure responsive snap member being normally biased into a first position but snapping to a second position when pressure in said reference chamber exceeds a predetermined level; and
   a switch which is opened and closed in response to said pressure responsive snap member.

2. The apparatus of claim 1 wherein said predetermined level is exceeded when the output of the evaporator exceeds a certain level of superheat.

3. The apparatus of claim 1 wherein said reference charge is sufficient to ensure a two-phase mixture in said reference cavity.

4. The apparatus of claim 1 further comprising an outer layer of thermal insulation disposed on said casing.

5. The apparatus of claim 1 wherein said casing is made of a material having a high thermal conductivity.

6. The apparatus of claim 1 wherein said casing has a cavity formed therein, said pressure responsive snap member being located in said cavity so as to close off said cavity, thereby defining said reference chamber.

7. The apparatus of claim 6 wherein said pressure responsive snap member is a disk having a larger diameter than the portion of the cavity where said snap member is located.

8. The apparatus of claim 7 further comprising an annular recess formed in said cavity, said snap member being disposed in said annular recess.

9. The apparatus of claim 8 further comprising a sealing member disposed in said annular recess.

10. The apparatus of claim 1 wherein said switch comprises a stationary contact and a movable contact normally biased out of contact with said stationary contact, said contacts being closed when said pressure responsive snap member is in said first position and open when said pressure responsive snap member is in said second position.

11. The apparatus of claim 10 wherein said pressure responsive snap member is convex with respect to said switch when in said first position and concave with respect to said switch when in said second position.

12. The apparatus of claim 11 further comprising a transmission member located between said pressure responsive snap member and said movable contact, said transmission member transmitting displacement of said pressure responsive snap member to said movable contact.

13. The apparatus of claim 1 wherein said switch comprises a stationary contact and a movable contact normally biased into contact with said stationary contact, said contacts being open when said pressure responsive snap member is in said first position and closed when said pressure responsive snap member is in said second position.

14. The apparatus of claim 13 wherein said pressure responsive snap member is convex with respect to said switch when in said first position and concave with respect to said switch when in said second position.

15. The apparatus of claim 14 further comprising a transmission member located between said pressure responsive snap member and said movable contact, said transmission member transmitting displacement of said pressure responsive snap member to said movable contact.

16. The apparatus of claim 1 wherein said switch comprises first and second stationary contacts and a movable contact normally biased into contact with said first stationary contact, said movable contact being in contact with said second contact when said pressure responsive snap member is in said first position and in contact with said first contact when said pressure responsive snap member is in said second position.

17. The apparatus of claim 16 wherein said pressure responsive snap member is convex with respect to said switch when in said first position and concave with respect to said switch when in said second position.

18. The apparatus of claim 17 further comprising a transmission member located between said pressure responsive snap member and said movable contact, said transmission member transmitting displacement of said pressure responsive snap member to said movable contact.

* * * * *